Dec. 12, 1967  L. H. PERRY  3,357,693
ENERGIZER FOR FLUID SEAL
Original Filed May 28, 1963
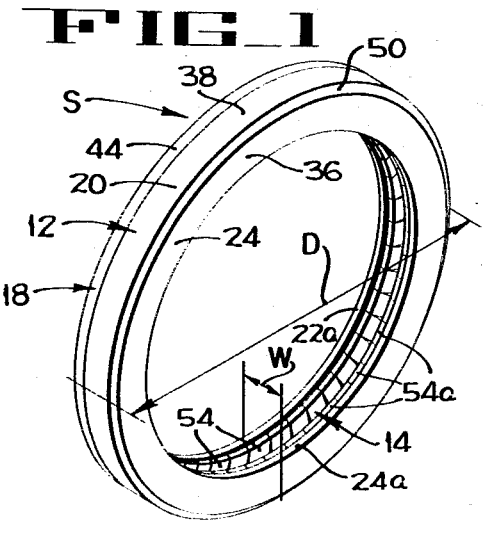
FIG_1
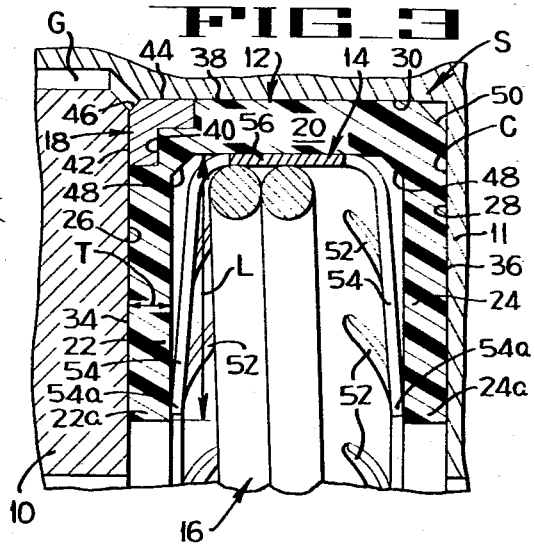
FIG_3
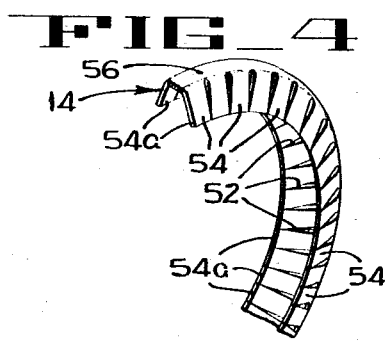
FIG_4
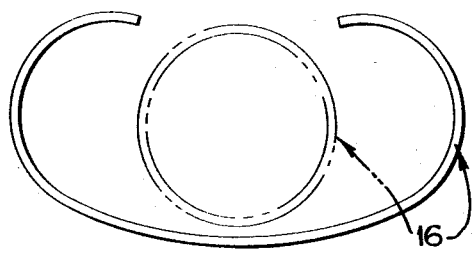
FIG_5
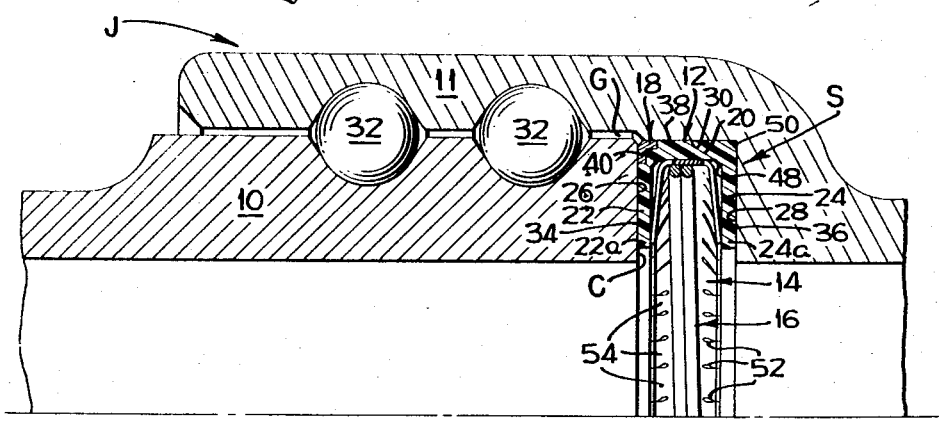
FIG_2
INVENTOR
LANDIS H. PERRY
BY Francis W. Anderson
ATTORNEY United States Patent Office 3,357,693
Patented Dec. 12, 1967

3,357,693
ENERGIZER FOR FLUID SEAL
Landis H. Perry, Newport Beach, Calif., assignor to FMC Corporation, San Jose, Calif., a corporation of Delaware
Original application May 28, 1963, Ser. No. 283,730, now Patent No. 3,301,568, dated Jan. 31, 1967. Divided and this application Dec. 6, 1966, Ser. No. 599,614
5 Claims. (Cl. 267—1.5)

ABSTRACT OF THE DISCLOSURE

A seal energizer with a plurality of resiliently flexible members having contiguous corners for applying a substantially continuous line of pressure to a fluid sealing element.

---

The present application is a division of my prior co-pending application, Ser. No. 283,730, filed May 28, 1963, now Patent No. 3,301,568 for fluid seal.

The present invention pertains to an energizer for a fluid seal and more particularly to an energizer capable of applying pressure substantially continuously over a predetermined line and yet being yieldable over short segments of the line without releasing its seal-establishing pressure over the remainder of the line.

In the development of the present invention, non-elastomeric plastic materials revealed a surprising result: if a thin envelope of the material was employed in place of the common massive seal element, sufficient flexibility could be retained even under extremely low temperatures to prevent cracking and to maintain a satisfactory seal. Furthermore, in such thin envelopes, their inherent flexibility enables the sealing surface to ride over minor irregularities of the associated swivel joint surface and thereby prevent flaking and bunching of the material. However, even with such thin envelope seal elements, difficulty was experienced in certain cases where cracking was evident and it was determined that, during use, the envelope had moved slightly away from the seal chamber walls so that, when pressure was applied under low temperature conditions, the material was again stressed beyond its very limited elastic limits. To prevent this, and in accordance with the present invention, a spring energizer has been developed which will retain the seal element in firm contact with the chamber walls under all conditions to minimize envelope movement, even when subjected to pulsating pressures. If adequate force is applied to the wall lips of the thin envelope by the energizer, the seal was found to form an efficient fluid-tight joint even with less than atmospheric pressures.

Accordingly, it is an object of the present invention to provide an improved energizer for a fluid seal.

Another object is to provide an energizer for a fluid seal capable of applying pressure substantially continuously over a predetermined line and yet being yieldable over short segments of the line without releasing its seal-establishing pressure over the remainder of the line.

Another object is to provide a spring energizer which will retain a non-elastomeric seal element in sealing contact with a predetermined surface.

These, together with other objects will become apparent upon reference to the following description and accompanying drawings, in which:

FIGURE 1 is a perspective of a swivel joint seal incorporating an energizer embodying the principles of this invention.

FIGURE 2 is a partial longitudinal section of a swivel pipe point employing the seal illustrated in FIGURE 1.

FIGURE 3 is an enlarged fragmentary section of the seal and seal chamber of the swivel joint illustrated in FIGURE 2.

FIGURE 4 is a fragmentary perspective of the scalloped energizer ring embodying the present invention.

FIGURE 5 is an elevation of the wire spring employed in the seal illustrated in FIGURES 1-3 drawn to a reduced scale and indicating the free and compressed configurations of the spring.

Referring generally to FIGURES 1 to 5, the swivel joint seal S illustrated in FIGURE 1 is adapted to be housed within an annular chamber C formed between members 10 and 11 of a swivel joint J shown in FIGURE 2. The seal S includes four parts: an annular seal element or envelope 12, a scalloped spreader ring or energizer 14 embodying the present invention, an expander spring 16, and anti-extrusion ring 18.

The annular envelope 12 is molded to precise tolerances from "Teflon," a common polymer of tetrafluoroethylene, and is of rectangular U-shaped cross section, having a cylindrical back portion 20 and radial sidewall portions 22 and 24. The open side of the envelope in the present example faces radially inward and the inner parts of the side walls 22 and 24 which bound the open side form sealing lips 22a and 24a respectively.

As clearly shown in FIGURE 3, the envelope 12 is adapted to fit within the chamber C formed between the two swivel joint members 10 and 11 of joint J. The chamber C is bounded by three faces—a radial face 26 on member 10, a radial face 28 and a joining cylindrical face 30 on member 11. As indicated in FIGURE 2, the members 10 and 11 are rotatably held in axial alignment by means of ball bearings 32, and the chamber faces 26 and 30 are separated by small corner gap G.

Since the envelope 12 is of rectangular U-shaped cross-section and, as subsequently explained, its diameter and width closely approximate the diameter and width of the chamber C, it will have three principal faces corresponding respectively, to the faces 26, 28 and 30 of the joint members 10 and 11. Specifically, when the seal S is housed within the chamber C as illustrated in FIGURES 2 and 3 external radial faces 34 and 36 of the seal envelope are in contact with radial faces 26 and 28, respectively of the swivel joint members 10 and 11 and the external cylindrical face 38 is in contact with the cylindrical surface 30 of the swivel joint member 11. The radial faces 34 and 36 bound the side wall portions 22 and 24 of the envelope, while the cylindrical face 38 bounds the back portion 20.

Since the seal S may be employed with high fluid pressures, there is some danger that a portion of the envelope material might be extruded into the gap G unless the anti-extrusion ring 18 is employed to block the gap. The ring 18 is of conventional design, being formed from stainless steel and being L-shaped in section. Accordingly, in the case of seals S intended for high pressure service, the exterior envelope corner formed by the faces 34 and 38 is recessed or stepped at 40 to accommodate the anti-extrusion 18 so that the radial face 42 of the ring will be flush with the envelope surface 34 and the cylindrical periphery 44 of the ring will be flush with the cylindrical surface 38 of envelope 12. Any sharp edges or burrs on the corner of the anti-extrusion 18 are eliminated by the formation of a chamber 46 which is disposed opposite the gap G when the seal S is in place within the chamber C.

Since the envelope material "Teflon" is inherently non-resilient, the scalloped energizer strip or ring 14 of the present invention is provided in order to force the annular lips 22a and 24a of the wall sections 22 and 24 into contact with the radial faces 26 and 28 of the swivel joint members 10 and 11. The energizer ring 14 is formed from a punched strip of thin stainless steel and, after being bent to the ring-shape partly illustrated in FIGURE 4, is hard tempered. A large number of equally spaced laterally extending narrow slots 52 are formed by the punching operation on each side of the energizer strip to create a similar number of fingers 54, which extend laterally from, and are joined together by, an integral base portion 56. The relative width of the slots and the fingers is carefully proportioned with regard to the diameter of the seal S so that, when the bent energizer ring 14 is inserted into the enevelope 12 as best shown in FIGURES 1 and 3, the fingers 54 touch the envelope only at their free ends 54a and so that, at the free ends 54a, the fingers are almost in contact with one another. As indicated, some degree of pre-shaping is applied to the energizer ring fingers 54 to bend them out of the plane of the base portion 56, but when the energizer ring 14 is placed within the envelope 12, the fingers 54 are resiliently bent together through a further substantial distance.

It will be appreciated that the energizer ring 14 has little radial strength since it is formed from thin gauge sheet material and its free ends are not secured together. Therefore, radial strength is imparted to the energizer ring 14 by means of the spring expander 16 which is illustrated in full lines in FIGURE 5 as it would appear when unstressed and, in phantom lines, as it would appear when compressed and operative. The spring 16 has sufficient radial strength to force the base portion 56 of the energizer ring 14 into contact with the base portion 20 of the envelope 12, although it need not have sufficient strength to radially expand the envelope to a substantial degree.

Thus, when the seal S is assembled and prior to its insertion in joint J, the fingers 54 of the energizer ring 14 push the annular envelope wall lips 22a and 24a axially apart by a distance greater than the envelope width W. When the seal is placed in the chamber C, however, the envelope 12 is forced back to substantially its original size and the sealing lips 22a and 24a are pressed firmly against the chamber walls 26 and 28 by the free ends 54a of the energizer ring fingers 54. In the latter condition, the energizer fingers 54 have been moved so that, not only are the free ends of the fingers on one side axially moved closer to the free ends of the opposite fingers on the other side, but, and more importantly, the free ends of adjacent fingers are moved circumferentially closer together. The latter movement results in the uniform support of the sealing lips 22a and 24a.

Thus, the resilient constriction of the fingers 54 in the manner described causes the sealing lips 22a and 24a of the envelope walls 22 and 24 to be pressed outward against the chamber walls with a pressure which is substantially uniform around the entire circumference of the sealing lips and in a way that does not restrict the flexibility or normal movement of the sealing lips and wall portions. As a result, the ability of the envelope 12 to resist thermal and fluid pressure stresses is unhampered by the energizer ring 14 since the energizer ring only contacts the envelope at the center of the back portion 20 and at the lips 22a and 24a of the wall portions 22 and 24, the axial width of the energizer base strip 56 being substantially less than the axial width of the envelope back portion 20.

In summary, it will be noted that by a judicious combination of features a non-elastomeric seal envelope has been developed which is substantially inert and unaffected by temperatures and pressures within the ranges considered and yet, by virtue of the energizer described, possesses sufficient resilience to form a satisfactorily seal at pressures down to and below atmospheric. If it is desired to form a seal which will operate satisfactorily at the lower extreme of the temperature range, another well known polymer of trifluorochlorethylene, "Kel-F," may be employed as the envelope material and the envelope should be formed slightly larger in diameter and width than the swivel joint chamber. In such a case, the envelope would be pre-shrunk by chilling with liquid nitrogen or the like before it is inserted into the chamber.

It will be apparent to those skilled in the art that various modifications and alterations can be made to the energizer described without departing from the spirit or scope of the present invention.

The invention having thus been described, that which is claimed to be new and which is desired to be protected by Letters Patent is:

1. A seal energizer comprising an arcuate base portion concentric with a line of reference, and a plurality of pressure applying members connected to the base portion and collectively concentric with said reference line, said members being resiliently flexible relative to the base portion, each member being in obtuse angular relation to said base portion in the unstressed condition of such member, each of said members having opposite side edges and a terminal edge joining the side edges at corners, the terminal edges of all the members substantially lying on an arcuate pressure line which is concentric with said reference line, adjacent side edges of adjacent members converging from said base portion to said terminal edges, and adjacent corners of adjacent members being contiguous.

2. The seal of claim 1 wherein said base portion is annular and circumscribes said line of reference, wherein there are first and second groups of said pressure applying members in spaced relation to each other and circumscribing said reference line, each of said members being resiliently flexible relative to the base portion independently of the other members.

3. The seal of claim 2 wherein said pressure applying members project inwardly toward said line of reference in confronting relation to each other.

4. The seal of claim 1 wherein each of said pressure applying members is flat and substantially rectangular, all of said pressure appying members being of substantially the same size and shape.

5. The seal of claim 1 wherein said base portion and pressure applying members are metal.

References Cited

UNITED STATES PATENTS

| | | | |
|---|---|---|---|
| 2,366,161 | 1/1945 | Tweedale | 277—206 |
| 2,512,883 | 6/1950 | Warren | 277—152 |
| 2,630,343 | 3/1953 | Jones | 277—152 |
| 3,301,568 | 1/1967 | Perry | 277—142 |

ARTHUR L. LA POINT, *Primary Examiner.*

R. M. WOHLFARTH, *Assistant Examiner.*